United States Patent
Badaoui et al.

(10) Patent No.: US 10,878,154 B1
(45) Date of Patent: Dec. 29, 2020

(54) EVALUATION OF NETS FOR SUITABILITY OF TIME DOMAIN MULTIPLEXING DURING PARTITIONING AND PLACING A CIRCUIT DESIGN

(71) Applicant: Xilinx, Inc., San Jose, CA (US)

(72) Inventors: Raoul Badaoui, Los Gatos, CA (US); Xiaojian Yang, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/510,600

(22) Filed: Jul. 12, 2019

(51) Int. Cl.
| | |
|---|---|
| G06F 17/50 | (2006.01) |
| G06F 30/347 | (2020.01) |
| G06F 30/337 | (2020.01) |
| G06F 30/34 | (2020.01) |
| G06F 30/392 | (2020.01) |
| G06F 30/3312 | (2020.01) |
| G06F 30/30 | (2020.01) |
| G06F 119/12 | (2020.01) |

(52) U.S. Cl.
CPC .......... G06F 30/347 (2020.01); G06F 30/337 (2020.01); G06F 30/3312 (2020.01); G06F 30/34 (2020.01); G06F 30/392 (2020.01); G06F 30/30 (2020.01); G06F 2119/12 (2020.01)

(58) Field of Classification Search
None
See application file for complete search history.

(56) References Cited

U.S. PATENT DOCUMENTS

| | | | | |
|---|---|---|---|---|
| 8,332,795 | B2* | 12/2012 | Chen ..................... | G06F 30/34 716/116 |
| 8,726,219 | B2* | 5/2014 | Borkovic ............ | G06F 30/3312 716/132 |
| 9,038,013 | B2* | 5/2015 | Pandey ................ | G06F 30/327 716/129 |
| 10,169,505 | B2* | 1/2019 | Lepercq ............... | G06F 30/394 |

OTHER PUBLICATIONS

P. Andersson et al., "Performance Oriented Partitioning for Time-Multiplexed FPGA's," 2000 IEEE, pp. 60-66. (Year: 2000).*
M. Inagi et al., "Globally Optimal Time-Multiplexing in Inter-FPGA Connections for Accelerating Multi-FPGA Systems," 2009 IEEE, pp. 212-217. (Year: 2009).*

(Continued)

*Primary Examiner* — Leigh M Garbowski
(74) *Attorney, Agent, or Firm* — Crawford Maunu PLLC (57) ABSTRACT

The disclosed approaches involve evaluating by a design tool executing on a computer system, a plurality of nets of a circuit design for individual levels of suitability for cutting each net into a cut net that crosses a partition boundary between a plurality of partitions of an integrated circuit (IC) device. The design tool partitions the circuit design. The partitioning includes cutting one or more of the nets into cut nets and favoring the cutting of ones of the plurality of nets having a greater level of suitability over others of the plurality of nets having a lesser level of suitability. The design tool assigns each cut net to one group of a plurality of groups and inserts respective time-division multiplexing circuitry on each group of cut nets. The design toon then places the circuit design on the IC device.

15 Claims, 7 Drawing Sheets

(56) References Cited

OTHER PUBLICATIONS

A. Kashif et al., "Experimental Evaluation and Comparison of Time-Multiplexed Multi-FPGA Routing Architectures," 2016 IEEE 59th Int'l Midwest Symposium of Circuits and Systems (MWSCAS), 4 pages. (Year: 2016).*
Z. Zong et al., "Pin Multiplexing Optimization in FPGA Prototyping System," The 2017 4th Int'; Conference on Systems and Informatics (ICSAI 2017), IEEE, pp. 721-725. (Year: 2017).*
S.-C. Chen et al., "Simultaneous Partitioning and Signals Grouping for Time-Division Multiplexing in 2.5D FPGA-Based Systems," ACM ICCAD '18, Nov. 5-8, 2018, San Diego, CA, 7 pages. (Year: 2018).*
W.-S. Kuo et al., "Pin Assignment Optimization for Multi-2.5D FPGA-based Ssystems," 2018 ACM, ISPD '18, pp. 106-113. (Year: 2018).*
C.-W. Pui et al., "An Analytical Approach for Time-Division Multiplexing Optimization in Multi-FPGA based Systems," ACM SLIP '19, Jun. 2, 2019, Las Vegas, NV, 8 pages. (Year: 2019).*

* cited by examiner

EVALUATION OF NETS FOR SUITABILITY OF TIME DOMAIN MULTIPLEXING DURING PARTITIONING AND PLACING A CIRCUIT DESIGN

TECHNICAL FIELD

The disclosure generally relates to partitioning and placing a circuit design.

BACKGROUND

The design flow for electronic circuit designs involves placing nets of the circuit design on circuit resources of a semiconductor integrated circuit die. In some cases, placing the nets may include partitioning the design amongst multiple regions of a die or amongst multiple dice. Some devices having multiple regions may have a limited number of inter-region connection resources available for carrying signals between regions. Thus, the partitioning of a circuit design across multiple regions is constrained by the number of inter-region connection resources.

Depending on the size and topology of a circuit design, the limited number of inter-region connection resources might create problems in partitioning. Partitioning of some designs can fail if there are insufficient inter-region connection resources to satisfy needed signal routing. Partitioning of other designs may succeed, but the result may have congestion of nets in some regions because of inter-region connection constraints imposed on the partitioning process. Congestion of nets can make routing the nets difficult and result in excessive time spent computing routes.

SUMMARY

A disclosed method includes evaluating by a design tool executing on a computer system, a plurality of nets of a circuit design for individual levels of suitability for cutting each net into a cut net that crosses a partition boundary between a plurality of partitions of an integrated circuit (IC) device. In performing the method, the design tool partitions the circuit design. The partitioning includes cutting one or more of the nets into cut nets and favoring the cutting of ones of the plurality of nets having a greater level of suitability over others of the plurality of nets having a lesser level of suitability. The design tool assigns each cut net to one group of a plurality of groups and inserts respective time-division multiplexing circuitry on each group of cut nets. The design toon then places the circuit design on the IC device.

A disclosed system includes one or more computer processors and a memory arrangement coupled to the one or more computer processors. The memory arrangement is configured with instructions that when executed by the one or more computer processors cause the one or more computer processors to perform operations that include evaluating a plurality of nets of a circuit design for individual levels of suitability for cutting each net into a cut net that crosses a partition boundary between a plurality of partitions of an integrated circuit (IC) device. The instructions cause the one or more computer processors to partition the circuit design. The partitioning includes cutting one or more of the nets into cut nets and favoring the cutting of ones of the plurality of nets having a greater level of suitability over others of the plurality of nets having a lesser level of suitability. The instructions cause the one or more computer processors to assign each cut net to one group of a plurality of groups and to insert respective time-division multiplexing circuitry on each group of cut nets. The instructions further cause the one or more computer processors to placing the circuit design on the IC device.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and system provide improved approaches for partitioning a circuit design across multiple regions of an integrated circuit (IC) device. An IC device may comprise a single semiconductor die or multiple semiconductor dice assembled into an IC package. Depending on the IC architecture, a circuit design may be partitioned between multiple regions of a single die or between multiple dice. Though the methods systems are illustrated with respect to a device having multiple dice, the disclosed approaches are applicable to single die devices as well.

The improved partitioning approaches evaluate suitability of nets for cutting and applying TDM, and those levels of suitability are used to select which nets to cut. Another feature of the disclosed approaches effectively assembles groups of the cut nets for applying time domain multiplexing (TDM) and reduce congestion of signal routes. The disclosed approaches yield solutions that require fewer connections between regions and thereby reduce congested areas.

According to the disclosed approaches, an electronic design automation (EDA) tool ("design tool" for brevity) executes on a computer system and evaluates the nets of a circuit design for respective levels of suitability for cutting. Once a net is cut, the cut net spans boundaries between partitions/regions of an IC device. In partitioning the circuit design, the design tool selects and cuts nets based on the determined levels of suitability for cutting. The partitioning process favors cutting of nets having greater levels of suitability over nets having lesser levels of suitability. Once the nets have been cut, the design tool assigns the cut nets to groups. The grouping of cut nets is used in establishing TDM circuitry. Based on the grouping of cut nets, the design tool inserts respective TDM circuitry on each group of cut nets. That is, the cut nets in each group share TDM circuitry. Once the TDM circuitry is instantiated, the design tool places the circuit design on the IC device.

Figure 1:
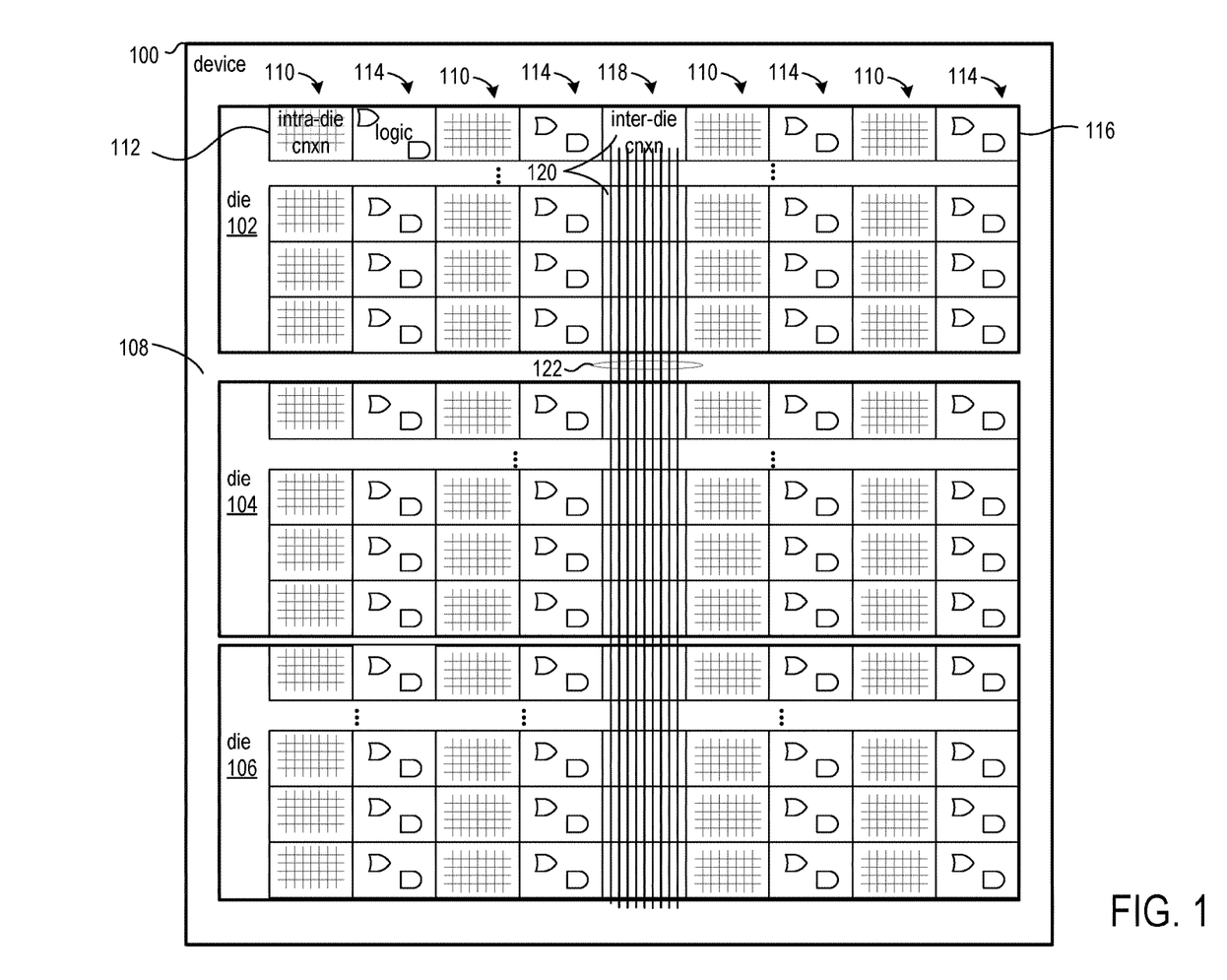
FIG. 1 shows an exemplary IC device having multiple integrated circuit dice disposed on a silicon substrate.

FIG. 1 shows an exemplary IC device 100 having multiple integrated circuit dice 102, 104, 106 disposed on a silicon substrate 108. Though the disclosed approaches are described in the context of IC devices having multiple dice, the partitioning methods can be applied to single die IC devices as well.

Each die 102, 104, 106 of the exemplary device 100 has columns 110 of programmable intra-die connection tiles 112, and columns 114 of programmable logic tiles 116. Each die further includes a column 118 having inter-die connection tiles 120 through which signals can be routed between dice. Actual programmable IC dice can have many more columns of programmable intra-die connection and programmable logic tiles, as well as additional columns of inter-die connection tiles, and the disclosed approaches are applicable thereto. Moreover, actual programmable IC dice may include columns having both programmable logic tiles and inter-die connection tiles. The inter-die connection tiles can be located at the bottom or top of a column in order to simplify layout of signal lines in the interposer. The dice may further include digital signal processing tiles, input/output tiles, memory blocks etc.

Based on a circuit design, the intra-die connection tiles 112 are programmable to create signal paths between selected circuit elements on a die, and the programmable logic tiles 116 are programmable to create logic functions. The inter-die connection tiles 120 are programmable to create signal paths between circuit elements on different ones of the dice. The lines 122 illustrate the signal lines for carrying inter-die signals according to an implemented circuit design. Though only 9 inter-die interconnect lines are shown, an actual device would have many more inter-die interconnect lines. The inter-die signal lines provide for direct connections between two dice. In some applications, the connections are only between adjacent dice. In other applications, connections may be provided between non-adjacent dice.

The dice 102, 104, and 106 are arranged side-by-side in a stacked arrangement on the silicon substrate. Stacking the dice, such as field programmable gate array (FPGA) dice, enables manufacture of large capacity devices by assembling multiple, better yielding, smaller dies on a silicon interposer and manufactured in a stable and proven process.

In an exemplary device, the dice 102, 104, and 106 are identical to one another, though the disclosed approaches are applicable to dissimilar die. Each die can be structured to include multiple clock regions (not shown), and each clock region can include multiple columns 110 of intra-die connection tiles and multiple columns 114 of programmable logic tiles. Two or more columns 118 of inter-die connection tiles can be provided for each clock region. For purposes of illustration only, the height of each column 110 and 114 can be 60 intra-die connection tiles 112.

Figure 2:
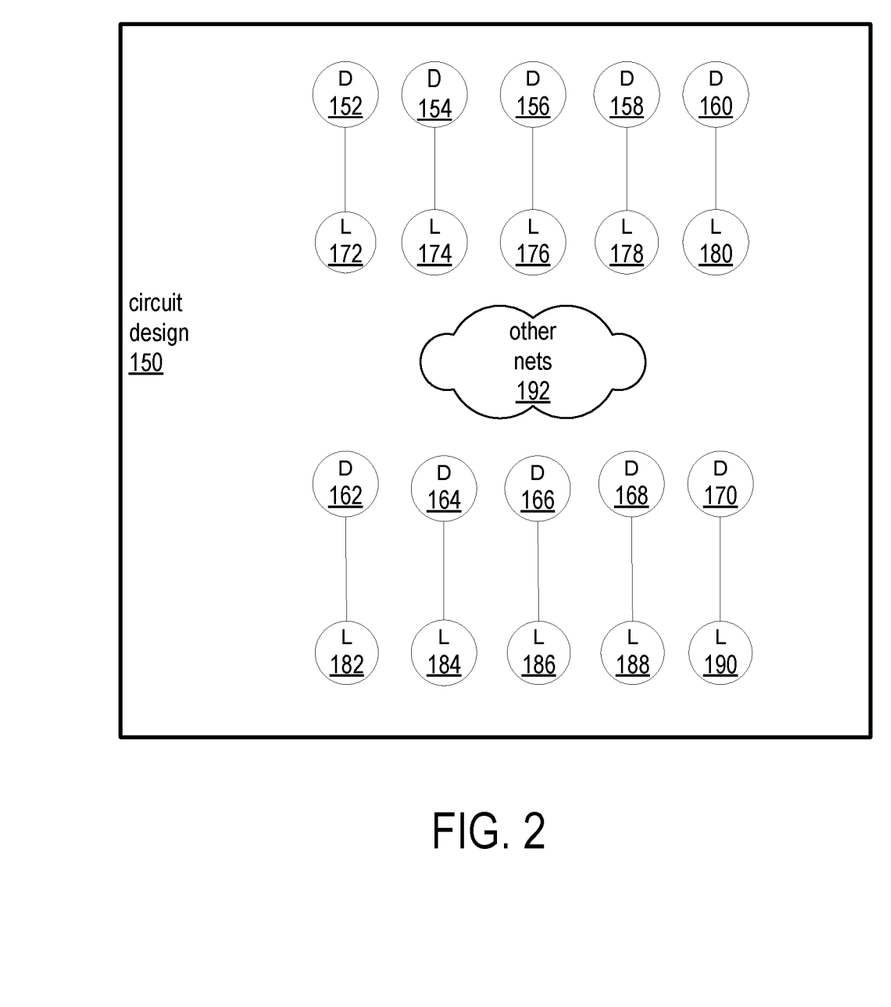
FIG. 2 shows an exemplary circuit design that can be partitioned according to the disclosed approaches.

FIG. 2 shows an exemplary circuit design 150 that can be partitioned according to the disclosed approaches. The exemplary circuit design includes nets having drivers 152, 154, 156, 158, 160, 162, 164, 166, 168, and 170. For ease of illustration, each of the exemplary nets has only a single load connected to the driver of the net. The loads include loads 172, 174, 176, 178, 180, 182, 184, 186, 188, and 190, which are connected to the drivers 152, 154, 156, 158, 160, 162, 164, 166, 168, and 170, respectively. The circuit design can include additional nets 192.

Prior to partitioning the nets, the nets of the circuit design are evaluated for suitability to be cut. When a net is cut, the driver of the net is assigned to one partition/region of the device, and the load(s) is assigned to another partition region of the device such that the cut net crosses a partition/region boundary. According to one approach, a clock period ratio is determined for each of the nets, and a cost is computed for each net based on the clock period ratio. The cost associated with a net indicates the suitability for cutting the net.

The clock period ratio of a net can be the ratio of a budget clock period associated with the net to a TDM clock period available for the net. The budget clock period is the clock period defined for the net by constraints of the circuit design, and the TDM clock period is the clock period supported by the target device and TDM circuitry that can be implemented on the target device. The clock period ratio can be adjusted downward by a TDM adjustment factor, which is a constant that accounts for delays incurred by TDM circuitry.

Based on the clock period ratios of the nets, respective costs of cutting the nets can be calculated as 1/clock period ratio. Thus, greater values of clock period ratios of nets imply a lesser cost and greater suitability for being cut than lesser values of clock period ratios. With fewer inter-region connection resources available than nets that can be cut, the costs allow the partitioning process to select those nets most suitable for cutting.

Figure 3:
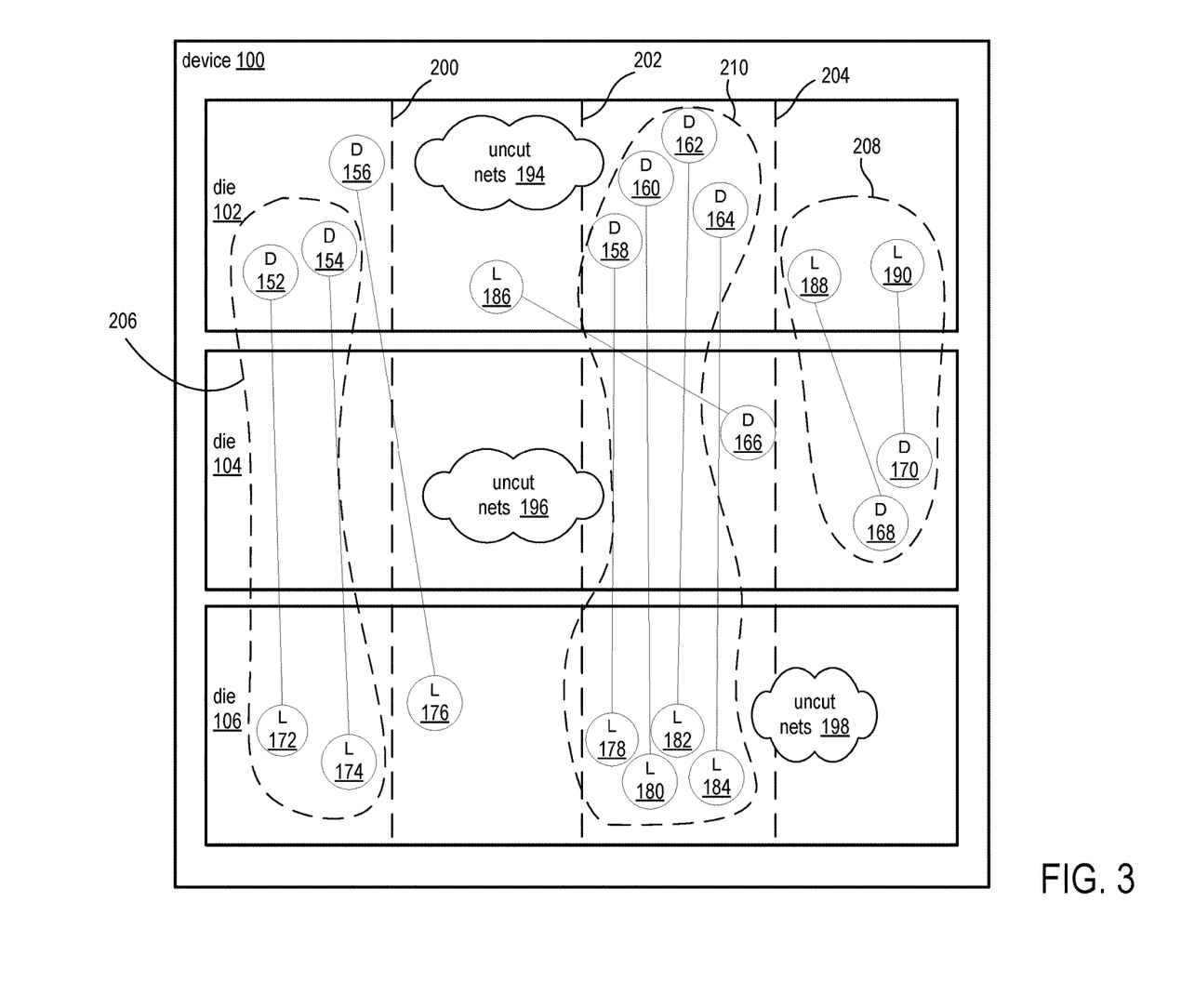
FIG. 3 shows nets of an exemplary circuit design partitioned for placement on an IC device.

FIG. 3 shows nets of an exemplary circuit design 150 (FIG. 2) partitioned for placement on the device 100. The partitioned circuit design shows cut nets and uncut nets. The cut nets in FIG. 3 correspond to the illustrated nets in FIG. 2, and the drivers 152, 154, 156, 158, 160, 162, 164, 166, 168, and 170 and loads 172, 174, 176, 178, 180, 182, 184, 186, 188, and 190 of the nets have been placed on dice 102, 104, and 106 as shown. FIG. 3 also illustrates the locations of the drivers and loads as placed on the dice. Uncut nets 194, 196, and 198 are ones of the other nets 192 (FIG. 2) that were not cut. Based on the costs computed for the nets as explained above and the available inter-die connection resources, the partitioning process cut some of the nets and left others of the nets uncut.

Once the nets have been cut and partitioned, the circuit design tool can assemble the cut nets into groups for sharing TDM circuitry. There can be two aspects to grouping of the nets. Firstly, the cut nets are grouped according to the computed clock ratios, and secondly, the cut nets are grouped according to proximity of the drivers and loads of the cut nets. Cut nets having equal clock ratios are grouped together, and the partitions are divided into sub-partitions to further refine the groups. The sub-partitions do not overlap and cover the area of the target device. Within each sub-partition, cut nets having the same clock ratio are grouped together into a TDM group. The grouping of cut nets according to the locations of the nets in sub-partitions effectively reduces the average distance between drivers in a TDM group relative the drivers in a crossing group.

The example of FIG. 3 shows the grouping of cut nets having equal clock ratios and dividing the dice of the device into sub-partitions. For example, the nets having drivers 152, 154, and 158 have equal clock ratios and can be grouped together. The dice 102, 104, and 106 are divided into sub-partitions and the cut nets are grouped within the sub-partitions. The dashed lines 200, 202, and 204 illustrate the boundaries between sub-partitions of the dice. In the exemplary device, each die is divided into the same number of sub-partitions. Cut nets having equal clock ratios and drivers and loads that occupy the same sub-partitions are assigned to the same TDM group. For example, the nets having drivers 152 and 154 can be assigned to same group 206, because the nets have equal clock ratios, have drivers in the same sub-partition of die 102, and have loads in the same sub-partition of die 106.

Cut nets that have equal clock ratios but occupy the different sub-partitions are not assigned to the same TDM group. For example, the nets having drivers 166, 168, and 170 can have equal clock ratios. But because driver 166 is placed in a different sub-partition from the sub-partition having drivers 168 and 170, the net having driver 166 is not assigned to the same TDM group 208 as the net having drivers 168 and 170. The cut nets in TDM group 210 are similarly grouped.

Figure 4:
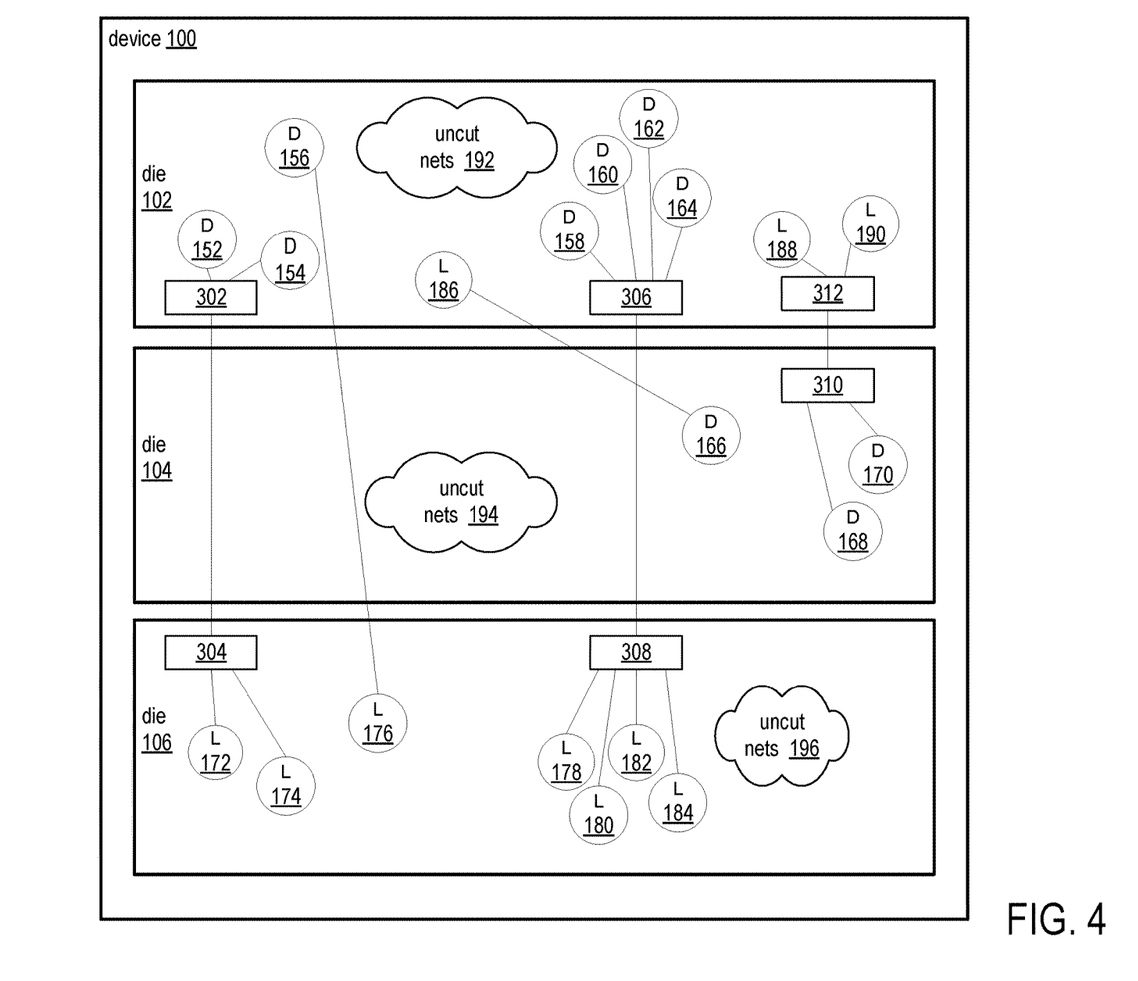
FIG. 4 shows instantiations of time domain multiplexing (TDM) circuitry instantiated for TDM groups of nets.

FIG. 4 shows instantiations of TDM circuitry instantiated for the TDM groups from FIG. 3. The TDM circuitry includes multiplexing and demultiplexing circuits for each of the TDM groups. The TDM circuitry for the TDM group having drivers 152 and 154 and loads 172 and 174 includes multiplexing circuit 302 and demultiplexing circuit 304. The TDM circuitry for the TDM group having drivers 158, 160, 162, and 164 and loads 178, 180, 182, and 184 includes multiplexing circuit 306 and demultiplexing circuit 308. The TDM circuitry for the TDM group having drivers 168 and 170 and loads 188 and 190 includes multiplexing circuit 310 and demultiplexing circuit 312.

In the exemplary device 100, the instantiated TDM circuitry can be connected to selected ones of the inter-die connection tiles 120 (FIG. 1), and the signal lines between inter-die connection tiles can carry the time domain multiplexed signals of the groups. For example, the output signal from multiplexing circuit 302 can be connected to an inter-die connection tile of die 102, and an output signal from an inter-die connection tile of die 106 can be connected to the input of demulitplexing circuit 304.

Figure 5:
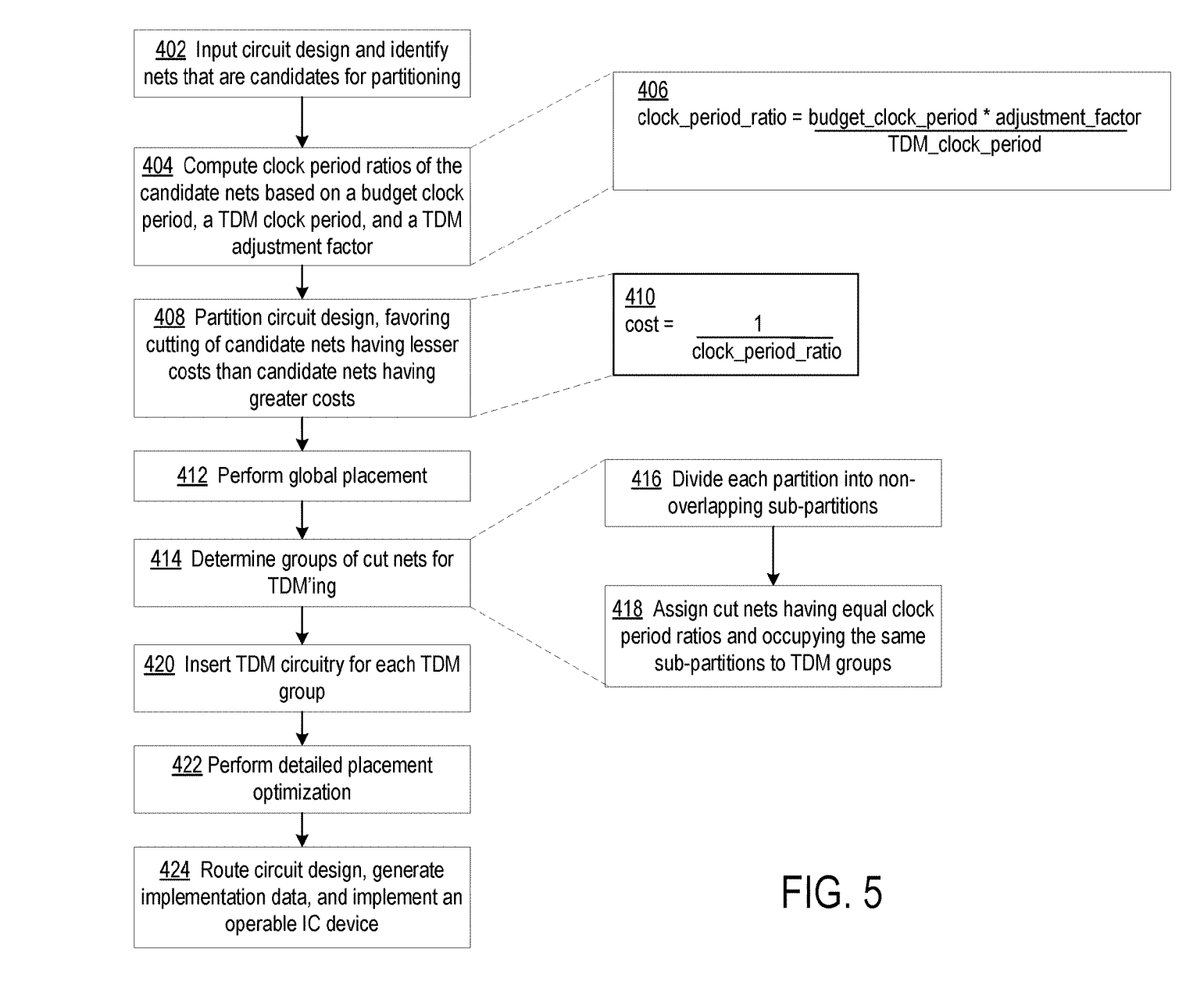
FIG. 5 shows a flowchart of a process for partitioning a circuit design according to suitability of individual nets for time domain multiplexing.

FIG. 5 shows a flowchart of a process for partitioning a circuit design according to suitability of individual nets for time domain multiplexing. At block 402, the design tool inputs a circuit design and identifies nets that are candidates for partitioning. All nets of the circuit design, with the exception of nets having placement constraints that require placement in particular regions of a device, are candidates for being cut in partitioning.

At block 404, the design tool evaluates the candidate nets for individual levels of suitability for partitioning. In evaluating the nets, the design tool computes respective clock period ratios for the candidate nets. The clock period ratios are based on the budget clock period, the TDM clock period, and a TDM adjustment factor. The clock period ratio is an estimate of the clock period available on the net and can be computed at block 406 as:

$$\mathrm{clock\_period\_ratio} = \mathrm{budget\_clock\_period} * \mathrm{adjustment\_factor} / \mathrm{TDM\_clock\_period}$$

where budget_clock_period is the budget clock period, adjustment_factor is the TDM adjustment factor, and TDM_clock_period is the TDM clock period, all as described above.

At block 408, the design tool partitions the circuit design, using the clock_period_ratios to favor cutting of nets having greater levels of suitability for being cut over nets having lesser levels of suitability. In partitioning a net, the net is cut such that the driver is assigned to one partition/region of the device, and load(s) is assigned to another partition/region of the device.

According to one approach, the design tool computes respective costs for cutting the nets based on the computed clock period ratios, and the cost of cutting a net can be computed at block 410 as: 1/clock_period_ratio.

Accordingly, nets having greater clock period ratios are more suitable to be cut than are nets having lower clock period ratios. Other factors can contribute to determine the cost of cutting a net as recognized by those skilled in the art. The disclosed approaches add the additional factor of suitability for TDM'ing to the cost of cutting a net. By reducing the cost of cutting a net to 1/clock_period_ratio, a greater number of nets can be identified as suitable for cutting and applying TDM circuitry.

At block 412, the design tool performs global placement of the circuit design after the nets have been partitioned. The global placement process can place elements of the circuit design on particular circuit resources at specific locations on die/dice of the device according to known approaches. The global placement process can also optimize placement consistent with timing and other physical constraints.

The design tool at block 414 assigns each cut net to a group, which may also be described as grouping the cut nets. The cut nets are grouped according to the respective clock period ratios and proximity to one another on the device. According to an exemplary approach, at block 416, the design tool divides each partition into multiple, non-overlapping sub-partitions that cover the device. That is, the area covered by the sub-partitions of a partition is co-extensive with the area of the partition. The partitions and sub-partitions can be represented by data structures in memory of the computer system hosting the design tool.

At block 418, the design tool assigns cut nets having equal clock period ratios and occupying the same sub-partitions to TDM groups. That is, the cut nets having equal clock period ratios, having drivers placed in the same sub-partition, and having loads placed in the same sub-partition are assigned to a TDM group. All cut nets in a TDM group have equal clock period ratios, have drivers placed in the same sub-partition, and have loads placed in the same sub-partition. The maximum number of cut nets in a TDM group is equal to the clock period ratio.

The design tool at block 420 instantiates TDM circuitry for each group of cut nets. For each group, the TDM circuitry includes a multiplexing circuit that inputs and multiplexes over time the signals from the drivers of the cut nets of the group, and a de-multiplexing circuit that de-multiplexes the time-multiplexed signals from the multiplexing circuit for output to the loads of the cut nets of the group. The multiplexing circuit and de-multiplexing circuits can be instantiated and placed in the same sub-partitions as the drivers and loads of the cut nets.

At block 422 and after instantiating the TDM circuitry, the design tool performs additional detailed placement and optimization according to known approaches.

A designer can optionally perform simulation (not shown) of the circuit design using the design tool. If simulation results are satisfactory, at block 424, the user can initiate further electronic design automation (EDA) tools to implement the circuit design as an operable circuit. The EDA tools can create a netlist from the modules of the circuit design, map the netlist to circuit resources of a target integrated circuit (IC), place-and-route and optimize the mapped circuit design, and perform any desired additional simulation using the netlist information. The design tools can then create implementation data, such as configuration data for a programmable IC or fabrication data for constructing an application-specific (ASIC). A circuit can be implemented by way of configuring a programmable IC with the configuration data or fabricating, making, or producing an ASIC from the fabrication data, thereby creating a circuit that operates according to the circuit design.

Figure 6:
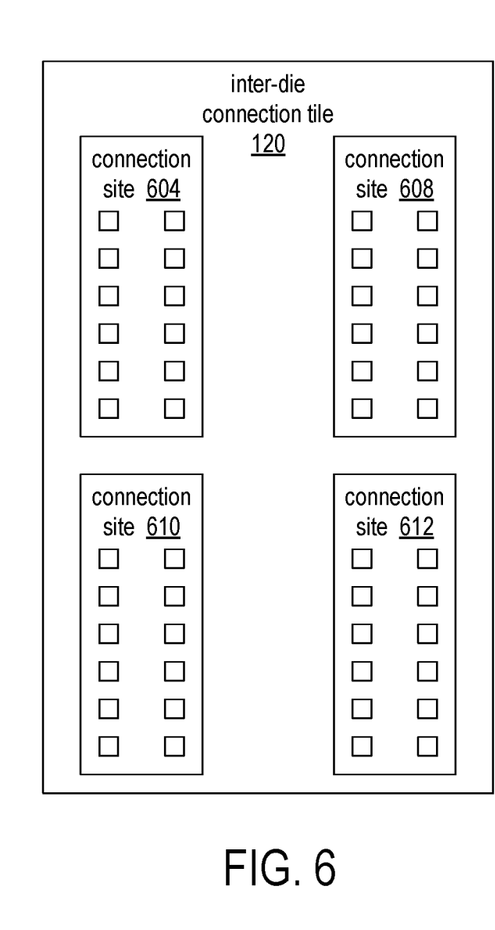
FIG. 6 shows an exemplary inter-die connection tile.

FIG. 6 shows an exemplary inter-die connection tile 120. The inter-die connection tiles provide connectivity between dice through signal lines (not shown) that connect to transmit flip-flops or receive flip-flops within connection sites 604, 608, 610, and 612. In an exemplary die, each inter-die connection tile can contain four connection sites, each site having six bi-directional inter-die connection lines.

Figure 7:
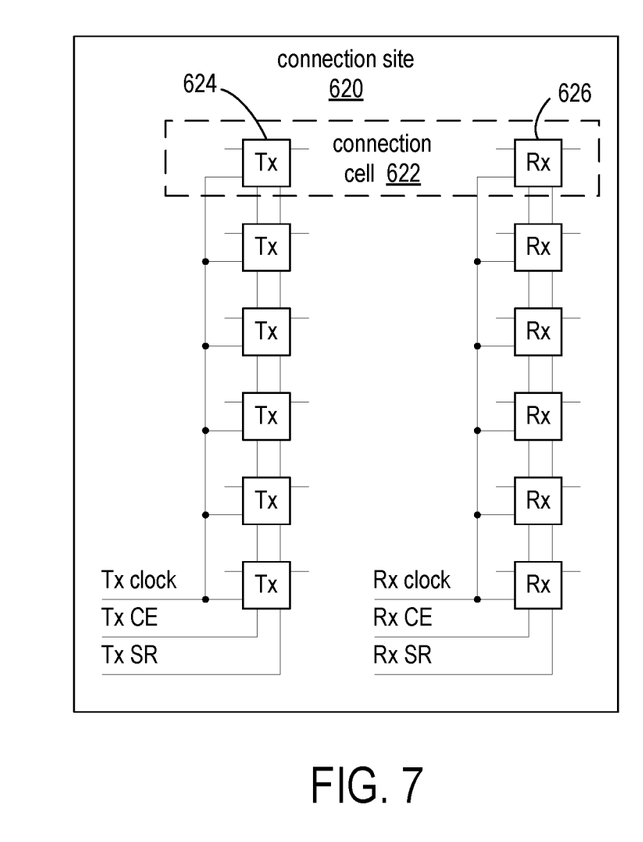
FIG. 7 shows an exemplary connection site of an inter-die connection tile.

FIG. 7 shows an exemplary connection site 620 of an inter-die connection tile. The connection site 620 includes multiple connection cells. Each connection cell includes a transmit flip-flop and a receive flip-flop. For example, connection cell 622 includes transmit flip-flop 624 and receive flip-flop 626. Each connection cell is paired with one and only one connection cell of an inter-die connection tile on a different die. The output of the transmit flip-flop and the input of the receive flip-flop of a connection cell connect to the same inter-die signal line.

The transmit flip-flops in a connection site are controlled by shared Tx clock, Tx CE and Tx SR signals, and the receive flip-flops are controlled by shared Rx clock, Rx CE and Rx SR signals. The data input signal to each transmit flip-flop can be connected to a signal generated from logic on the same die as that of the inter-die connection tile. Likewise, the data output signal from each receive flip-flop can be connected to logic on the same die as that of the inter-die connection tile.

Each of the inter-die signal lines can span the number of tiles in the columns of inter-die connection tiles of the stacked die. Thus, a device having a total of 60 inter-die connection tiles in a column that spans the stacked dice, can have 1440 inter-die signal lines (60 tiles*4 connection sites/inter-die connection tile*6 inter-die signal lines/connection site) for each column of inter-die connection tiles.

Figure 8:
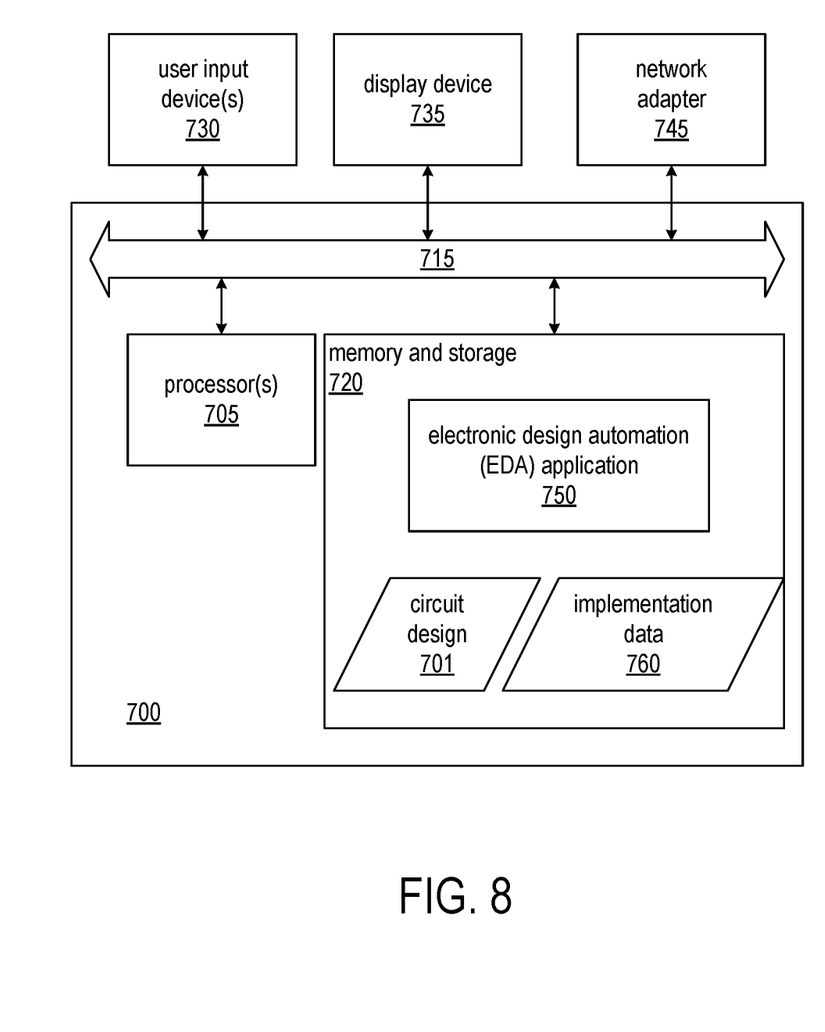
FIG. 8 is a block diagram illustrating an exemplary data processing system.

FIG. 8 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 701 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 701. In one aspect, system 700 performs a design flow on circuit design 701, and the design flow may include synthesis, mapping, placement, routing, and the partitioning techniques as described herein. System 700 generates implementation data 760 based on the circuit design 701.

EDA application 750, circuit design 7001, implementation data 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for partitioning and placing a circuit design. Other aspects and features will be apparent to those skilled in the art from consideration of the specification. It is intended that the specification and drawings be considered as examples only, with a true scope of the invention being indicated by the following claims.

What is claimed is:

1. A method comprising:
   evaluating by a design tool executing on a computer system, a plurality of nets of a circuit design for individual levels of suitability for cutting each net into a cut net that crosses a partition boundary between a plurality of partitions of an integrated circuit (IC) device, wherein the evaluating includes:
      determining respective clock period ratios of the plurality of nets, wherein each clock period ratio is based on a ratio of an initial clock period of one of the nets and a time domain multiplex (TDM) clock period available for the one of the nets, and a TDM adjustment factor that factors for delays incurred by TDM circuitry and reduces the clock period ratio, and
      assigning respective costs to the plurality of nets based on the respective clock period ratios, wherein each cost indicates the level of suitability for cutting the net;
   partitioning the circuit design by the design tool, wherein the partitioning includes cutting one or more of the nets into cut nets and favoring the cutting of ones of the plurality of nets having a greater level of suitability over others of the plurality of nets having a lesser level of suitability;

assigning each cut net to one group of a plurality of groups by the design tool;

inserting respective time-division multiplexing circuitry on each group of cut nets by the design tool; and placing the circuit design on the IC device by the design tool.

2. The method of claim 1, wherein the assigning the cut nets to groups includes assigning the cut nets to groups based on the respective clock period ratios and proximity of the cut nets to one another on the IC device.

3. The method of claim 1, wherein the determining respective clock period ratios of the plurality of nets includes determining each clock period ratio as x*y/z, wherein x is the initial clock period, y is the TDM adjustment factor, and z is the TDM clock period.

4. The method of claim 1, wherein the assigning the respective costs to the nets based on the respective clock period ratios includes determining each respective cost as 1/C, wherein C is the respective clock period ratio.

5. The method of claim 1, wherein the clock period ratio of each cut net in each group of the plurality of groups is equal to the clock period ratio of each other cut net in the group.

6. The method of claim 5, wherein the assigning each cut net to one group of a plurality of groups includes:

dividing each partition of the plurality of partitions into a plurality of sub-partitions; and assigning one or more cut nets having equal clock period ratios and disposed in a same sub-partition of the plurality of sub-partitions to a group of the plurality of groups.

7. The method of claim 6, wherein the determining respective clock period ratios of the plurality of nets includes determining each clock period ratio based on the ratio of the initial clock period of the respective net, the TDM clock period available for the respective net, and a TDM adjustment factor that reduces the clock period ratio.

8. The method of claim 1, further comprising determining by the design tool prior to the evaluating, a plurality of candidate nets of the circuit design that are eligible to be cut based on constraints associated with the nets.

9. The method of claim 1, further comprising:

generating implementation data from the circuit design; and making the integrated circuit device based on the implementation data.

10. A system comprising:

one or more computer processors; and a memory arrangement coupled to the one or more computer processors, wherein the memory arrangement is configured with instructions that when executed by the one or more computer processors cause the one or more computer processors to perform operations including:

evaluating a plurality of nets of a circuit design for individual levels of suitability for cutting each net into a cut net that crosses a partition boundary between a plurality of partitions of an integrated circuit (IC) device, wherein the evaluating includes:

determining respective clock period ratios of the plurality of nets, wherein each clock period ratio is based on a ratio of an initial clock period of one of the nets and a time domain multiplex (TDM) clock period available for the one of the nets, and a TDM adjustment factor that factors for delays incurred by TDM circuitry and reduces the clock period ratio, and assigning respective costs to the plurality of nets based on the respective clock period ratios, wherein each cost indicates the level of suitability for cutting the net;

partitioning the circuit design, wherein the partitioning includes cutting one or more of the nets into cut nets and favoring the cutting of ones of the plurality of nets having a greater level of suitability over others of the plurality of nets having a lesser level of suitability;

assigning each cut net to one group of a plurality of groups;

inserting respective time-division multiplexing circuitry on each group of cut nets; and placing the circuit design on the IC device.

11. The system of claim 10, wherein the assigning the cut nets to groups includes assigning the cut nets to groups based on the respective clock period ratios and proximity of the cut nets to one another on the IC device.

12. The system of claim 10, wherein the instructions for determining respective clock period ratios of the plurality of nets include instructions that when executed by the one or more computer processors cause the one or more computer processors to determine each clock period ratio as x*y/z, wherein x is the initial clock period, y is the TDM adjustment factor, and z is the TDM clock period.

13. The system of claim 10, wherein the instructions for assigning the respective costs to the nets based on the respective clock period ratios include instructions that when executed by the one or more computer processors cause the one or more computer processors to determine each respective cost as 1/C, wherein C is the respective clock period ratio.

14. The system of claim 10, wherein the clock period ratio of each cut net in each group of the plurality of groups is equal to the clock period ratio of each other cut net in the group.

15. The system of claim 14, wherein the instructions for assigning each cut net to one group of a plurality of groups include instructions that when executed by the one or more computer processors cause the one or more computer processors to:

divide each partition of the plurality of partitions into a plurality of sub-partitions; and assign one or more cut nets having equal clock period ratios and disposed in a same sub-partition of the plurality of sub-partitions to a group of the plurality of groups.

* * * * *